United States Patent

Roux et al.

[11] Patent Number: 5,096,583
[45] Date of Patent: Mar. 17, 1992

[54] MEMBRANE FILTERS FOR THE ULTRA OR MICRO FILTRATION OF LIQUIDS, ESPECIALLY WATER

[75] Inventors: J. P. Roux, St, Gratien; P. Vion, Houilled, both of France

[73] Assignee: Degremont, Rueil-Malmaison, France

[21] Appl. No.: 672,419

[22] Filed: Mar. 20, 1991

[30] Foreign Application Priority Data

Mar. 23, 1990 [FR] France ................. 90 03748

[51] Int. Cl.$^5$ ............................................. B01D 63/00
[52] U.S. Cl. ........................ 210/321.6; 210/321.78; 210/321.79; 210/321.89; 210/323.2; 210/416.1
[58] Field of Search .............. 210/321.88, 321.87, 210/321.6, 321.79, 416.1, 416.2, 195.2, 636, 332, 323.2, 651, 321.78, 321.8, 321.89, 500.23

[56] References Cited

U.S. PATENT DOCUMENTS

| | | | |
|---|---|---|---|
| 3,541,004 | 11/1970 | Cooper, IV | 210/414 |
| 3,821,108 | 6/1974 | Manjikian | 210/332 |
| 4,414,113 | 11/1983 | LaTerra | 210/636 |
| 4,540,490 | 9/1985 | Shibata et al. | 210/323.2 |
| 4,744,900 | 5/1988 | Bratt | 210/321.78 |
| 4,756,875 | 7/1988 | Tajima | 376/313 |
| 4,775,471 | 10/1988 | Nagai | 210/323.2 |
| 4,784,768 | 11/1988 | Mathiev | 210/321.8 |
| 4,876,006 | 10/1989 | Ohkubo et al. | 210/321.69 |

FOREIGN PATENT DOCUMENTS 2525488  4/1983  France.

Primary Examiner—Robert A. Dawson
Assistant Examiner—Ana Fortuna
Attorney, Agent, or Firm—Pollock, VandeSande & Priddy

[57] ABSTRACT

An appliance intended for the ultra- and mirco-filtration of liquids, especially water, by means of membranes consisting of fibers grouped in the form of tubular bundles. Filtration takes place from the inside of the fiber towards the outside, at the same time with an active recirculation of the liquid to be filtered. Such an appliance may take the form of a cylindrical containment with domed ends, in which the bundles of filter elements are either arranged between two superposed floors or fixed to a single floor, wherein the means intended for ensuring the recirculation of the liquid during filtration are incorporated in the appliance.

4 Claims, 1 Drawing Sheet

MEMBRANE FILTERS FOR THE ULTRA OR MICRO FILTRATION OF LIQUIDS, ESPECIALLY WATER

BACKGROUND OF THE INVENTION

The present invention relates to improvements to appliances intended for the ultra- or micro-filtration of liquids, especially water, by means of membranes consisting of fibers grouped in the form of tubular bundles, in which filtration takes place from the inside of the fiber towards the outside ("inner skin").

Such appliances take the form of a cylindrical containment, the ends of which are domed and in which the bundles of filter elements are either arranged between two superposed floors or fixed to a single floor.

These appliances are fed with liquid, such as water to be filtered, and the process requires a recirculation which is necessarily very great because of the design of the filter element, and which can reach ten times the production rate, in order to ensure an effective scavenging of the inside of the fibers forming the bundles.

Furthermore, at more or less frequent intervals, these fibers have to be cleared of particles, deposited on the surface during filtration, by being washed with water. This washing, called backwashing, is carried out by reversing the direction of the pressures in the appliance, and therefore by reversing the direction of flow through the wall of the fibers, thus causing these particles to be detached.

According to the conventional technique, the driving element or elements for the recirculation, such as pumping stations, turbines, screws or the like, are located outside the appliance.

SUMMARY OF THE INVENTION

According to the invention and in keeping with one of its characteristics, this element or these elements are incorporated in the appliance and are advantageously located in an axial conduit which is connected to the floor or floors supporting the filter elements.

According to another characteristic of the invention, the upper end of the appliance has a water reserve, making it possible to ensure the final rinsing of the fibers simply by emptying the appliance.

The various characteristics and advantages of the invention will emerge from the following description of some of its possible embodiments, on the understanding that these are purely non-limiting examples, and that any other forms, proportions and arrangements could be adopted, without departing from the scope of the invention.

DETAILED DESCRIPTION OF THE INVENTION

Figure 1:
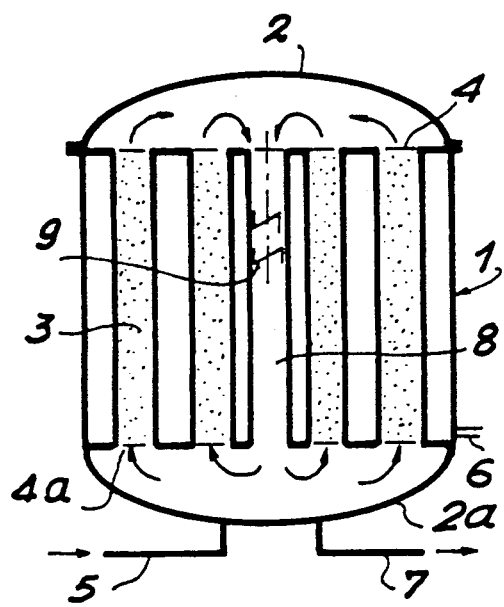
FIG. 1 is a perspective view partly in section of a preferred embodiment of the filtering apparatus of the present invention.

As is known, the appliance takes the form of a cylindrical containment 1 with domed ends 2, 2a. This containment contains the filter elements consisting of a set of bundles 3, grouping together hollow ultra- or micro-filtration fibers of the "inner skin" type, that is to say in which filtration takes place from the inside of the fiber towards the outside. In the example shown in FIG. 1, these bundles are arranged between two floors 4, 4a.

In this case, the appliance is fed with liquid, for example water to be filtered, by means of a pipeline 5 opening into the base of the appliance. The treated water, or permeate, is discharged from the inside of a bundle towards the outside by means of orifices made in its casing and is discharged from the appliance via a pipeline 6. This pipeline ensures that the fluid serving for backwashing is introduced into the appliance. Finally, the emptying of the appliance takes place via a pipeline 7.

According to the invention, a space is provided or made in the appliance along its axis between the bundles of filter modules and, in the example discussed, consists of a conduit 8, in which is arranged the driving element, such as a pump or screws 9, intended for ensuring that the liquid to be filtered is recirculated in the appliance.

The conduit 8 is flush with the upper and lower floors, under these conditions the volumes thus provided by the domed ends 2, 2a forming collecting zones for the recirculation entering and leaving the modules.

Since any member, means or device external to the appliance is eliminated, this arrangement according to the invention affords particularly the following advantages:

reduction of the ground area of a filtration unit and therefore an increase in the production of treated liquid per unit area, reduction of the production cost by the elimination of elements such as pipework, supports etc., reduction of the energy consumption, the saving obtained corresponding to the pressure losses brought about by the eliminated pipework.

Figure 2:
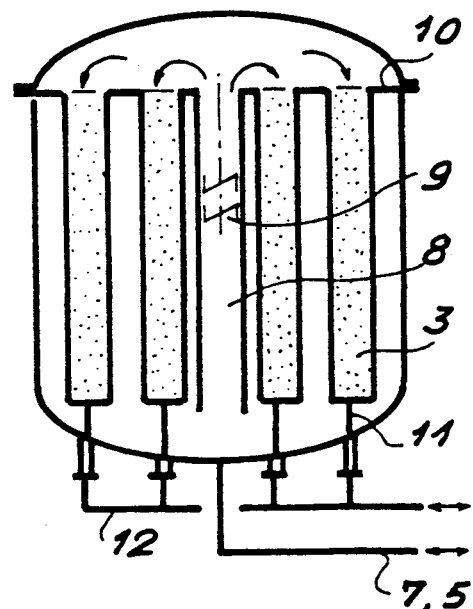
FIG. 2 is a perspective view partly in section of an alternative preferred embodiment of the filtering apparatus of the present invention.

According to the embodiment illustrated in FIG. 2, the appliance comprises a single floor 10, to which are fixed the bundles 3, which, for this purpose, are equipped with a housing fastened at its upper edge to the floor 10.

In this case, as is known, the permeate is collected by a perforated permeate collection tube 11 located at the center of each bundle, and the various permeate collection tubes 11 are connected to a single collector 12 for discharging the permeate outside the appliance, this collector also serving as a pipeline for supplying the backwashing fluid to the appliance.

Figure 3:
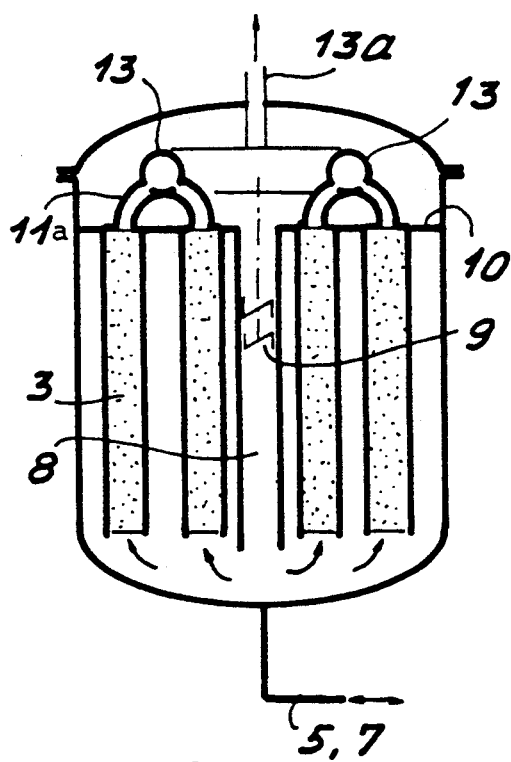
FIG. 3 is a perspective view partly in section of a filtering apparatus according to the present invention with a different arrangement of discharge collectors.

The appliance of FIG. 3 differs from the preceding one only in the arrangement of a permeate discharge collector 13 provided inside the appliance, feeding a discharge pipe 13a and collecting the permeate drained by the permeate collection 11a tubes of the bundles of fibers.

Figure 4:
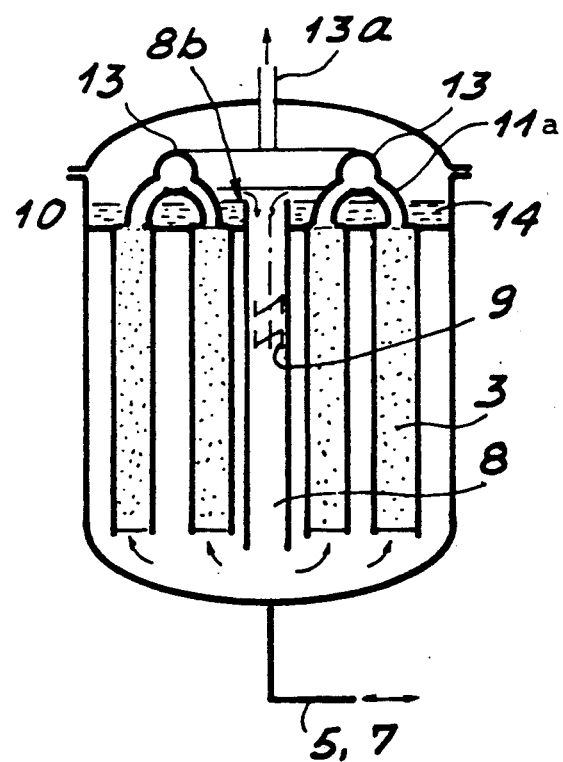
FIG. 4 is a perspective view partly in section of a filtering apparatus according to the present invention with a water resource.

FIG. 4 shows an appliance with a single floor 10, improved according to the invention, in which the conduit 8, where the means 9, pump or turbine, ensuring the recirculation of the liquid to be filtered is accommodated, is extended above the floor 10 over a height 8b, thus making it possible to form a water reserve 14 which is under pressure, constituting a volume greater than the inner volume of the fibers and ensuring a displacement of the cake and the scavenging of the fibers simply by emptying the appliance.

It should be clearly understood that the invention is in no way limited to the exemplary embodiments described and illustrated, but that it can give rise to many alternative versions, without thereby departing from its scope.

We claim:

1. An appliance intended for the ultra- and micro-filtration of liquids, especially water, by means of membranes consisting of fibers grouped in the form of tubular bundles, filtration taking place from the inside of the fiber towards the outside, such an appliance taking the form of a cylindrical containment with domed ends, in which the bundles of filter elements are either arranged between two superposed floors or fixed to a single floor, wherein a pump means ensuring the active recirculation of the liquid to be filtered during filtration is incorporated in a conduit in the appliance.

2. Appliance according to claim 1, wherein said means for ensuring the recirculation of the liquid is located along the application axis in a conduit open at it two ends and connected t the floor or floors supporting the filter elements.

3. Appliance according to claim 2, further comprising, in its upper part, a liquid reserve for cleaning the fibers simply by emptying the appliance.

4. Appliance according to claim 3, wherein said liquid reserve is formed by the extension of the axial conduit into the zone located above the floor.

* * * * *